US012159593B2

(12) United States Patent
Hong

(10) Patent No.: US 12,159,593 B2
(45) Date of Patent: Dec. 3, 2024

(54) DISPLAY DEVICE AND METHOD OF DRIVING THE SAME

(71) Applicant: LG Display Co., Ltd., Seoul (KR)

(72) Inventor: Moo Kyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/498,510

(22) Filed: Oct. 31, 2023

(65) Prior Publication Data

US 2024/0185804 A1 Jun. 6, 2024

(30) Foreign Application Priority Data

Dec. 6, 2022 (KR) ........................ 10-2022-0168717

(51) Int. Cl.
*G09G 3/30* (2006.01)
*G09G 3/3291* (2016.01)

(52) U.S. Cl.
CPC ... *G09G 3/3291* (2013.01); *G09G 2300/0828* (2013.01); *G09G 2310/0272* (2013.01); *G09G 2310/08* (2013.01)

(58) Field of Classification Search
CPC ...................................................... G09G 3/332
See application file for complete search history.

(56) References Cited

U.S. PATENT DOCUMENTS

2016/0189615 A1 6/2016 Kwon et al.
2019/0251900 A1 8/2019 Min et al.
2020/0184902 A1* 6/2020 Kim ..................... G09G 3/3291
2021/0104195 A1* 4/2021 Choi ..................... G09G 3/3258
2024/0046879 A1* 2/2024 Yang ..................... G09G 3/3258

FOREIGN PATENT DOCUMENTS

| | | | |
|---|---|---|---|
| CN | 107507576 | A | 12/2017 |
| EP | 2963636 | A1 | 1/2016 |
| KR | 10-2015-0073694 | A | 7/2015 |
| KR | 10-2017-0080261 | A | 7/2017 |
| KR | 10-2019-0142123 | A | 12/2019 |

OTHER PUBLICATIONS

Intellectual Property Office of the United Kingdom, Combined Search and Examination Report, United Kingdom Patent Application No. GB2318281.9, Jun. 5, 2024, eight pages.

* cited by examiner

*Primary Examiner* — Joseph R Haley
(74) *Attorney, Agent, or Firm* — Fenwick & West LLP

(57) ABSTRACT

A display device including a display panel includes a sub-pixel connected to a data line and a reference line, and a data driver including a panel driving circuit and a panel sensing circuit, wherein during a first sensing operation of a ADC of the panel sensing circuit, the panel sensing circuit supplies a first reference voltage to the display panel through the reference line and converts a voltage that is sensed through the reference line in into a digital signal using the analog-to-digital converter, and during a second sensing operation of an element included in the sub-pixel, the panel sensing control circuit supplies a second reference voltage to the display panel through the reference line and the panel driving circuit supplies the data voltage to the display panel through the data lineoffset correction.

20 Claims, 19 Drawing Sheets

DISPLAY DEVICE AND METHOD OF DRIVING THE SAME

CROSS-REFERENCE TO RELATED APPLICATION

This application claims the benefit of Republic of Korea Patent Application No. 10-2022-0168717, filed on Dec. 6, 2022, which is hereby incorporated by reference in its entirety.

BACKGROUND

Field of Technology

The present disclose relates to a display device and a method of driving the same.

Discussion of the Related Art

With the development of information technology, the market for display devices that are media for connection between users and information is growing. Accordingly, display devices such as an LED, a quantum dot display (QDD), and a liquid crystal display (LCD) have been increasingly used.

The above display devices each include a display panel including sub-pixels, a driver which outputs a driving signal for driving of the display panel, and a power supply which generates power to be supplied to the display panel or the driver.

In such a display device, when sub-pixels formed in a display panel are supplied with driving signals, for example, a scan signal and a data signal, a selected one thereof may transmit light therethrough or may directly emit light, thereby displaying an image.

SUMMARY

Accordingly, the present disclosure is directed to a display device and a method of driving the same that substantially obviate one or more problems due to limitations and disadvantages of the related art.

An object of the present invention is to perform offset correction of an analog-to-digital converter included in each of sensing circuit units based on a circuit used for actual sensing without using a separate voltage or a separate dummy circuit, thereby improving compensation accuracy when compared to the case of using the dummy circuit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment a a display device includes a display panel including a sub-pixel connected to a data line and a reference line, and a data driver including a panel driving circuit and a panel sensing circuit, the panel driving circuit configured to supply a data voltage to the display panel through the data line, and the panel sensing circuit including an analog-to-digital converter (ADC) and the panel sensing circuit configured to sense the display panel through the reference line, wherein during a first sensing operation of the ADC, the panel sensing circuit is configured to supply a first reference voltage to the display panel through the reference line and convert a voltage that is sensed through the reference line in response to the first reference voltage into a digital signal using the analog-to-digital converter without the panel driving circuit supplying the data voltage during the first sensing operation, and wherein during a second sensing operation of an element included in the sub-pixel, the panel sensing circuit supplies a second reference voltage to the display panel through the reference line and the panel driving circuit supplies the data voltage to the display panel through the data lineoffset correction.

In one embodiment, a method of driving a display device including a display panel comprising a sub-pixel connected to a data line and a reference line, and a data driver including a panel driving circuit and a panel sensing circuit, the panel driving circuit configured to supply a data voltage to the display panel through the data line, and the panel sensing circuit including an analog-to-digital converter (ADC) and the panel sensing circuit configured to sense the display panel through the reference line, the method comprises: turning on the display panel and displaying an image while the display panel is on; turning off the display panel; during a first sensing operation of the ADC while the display panel is off, supplying, by the panel sensing circuit, a first reference voltage to the display panel through the reference line and converting a voltage that is sensed through the reference line in response to the first reference voltage into a digital signal using the analog-to-digital converter without the panel driving circuit supplying the data voltage during the first sensing operation; and during a second sensing operation of an element included in the sub-pixel while the display panel is off, supplying, by the panel sensing circuit, a second reference voltage to the display panel through the reference line and supplying, by the panel driving circuit, the data voltage to the display panel through the data line.

In one embodiment, a display device comprises: a display panel including a sub-pixel; a data line connected to the sub-pixel; a reference line connected to the sub-pixel; a panel driving circuit connected to the sub-pixel through the data line, the panel driving circuit configured to supply a data voltage to the display panel through the data line; and a panel sensing circuit connected to the sub-pixel through the reference line, the panel sensing circuit including an analog-to-digital converter (ADC), a first switch connected to a first reference voltage, a second switch connected to a second reference voltage, and a third switch configured to connect the ADC to the reference line, wherein during a first sensing operation of the ADC, the first switch is configured to turn on to supply the first reference voltage to the sub-pixel through the reference line while the second switch is off, and the ADC is configured to convert a voltage that is sensed through the reference line in response to the first reference voltage into a digital signal while the third switch is turned on without the panel driving circuit supplying the data voltage during the first sensing operation, and wherein during a second sensing operation of an element included in the sub-pixel, the second switch is turned on to supply a second reference voltage to the sub-pixel through the reference line while the first switch is off and the panel driving circuit supplies the data voltage to the display panel through the data line after the second reference voltage is supplied to the sub-pixel. offset correction It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

A display device according to the present invention may be implemented as a television, a video player, a personal computer (PC), a home theater, an automotive electric device, or a smartphone, but is not limited thereto. The display device according to the present invention may be implemented as an LED, a QDD, or an LCD. For convenience of description, an LED device that directly emits light based on an inorganic light-emitting diode or an organic light-emitting diode will hereinafter be taken as an example of the display device according to the present invention.

Figure 1:
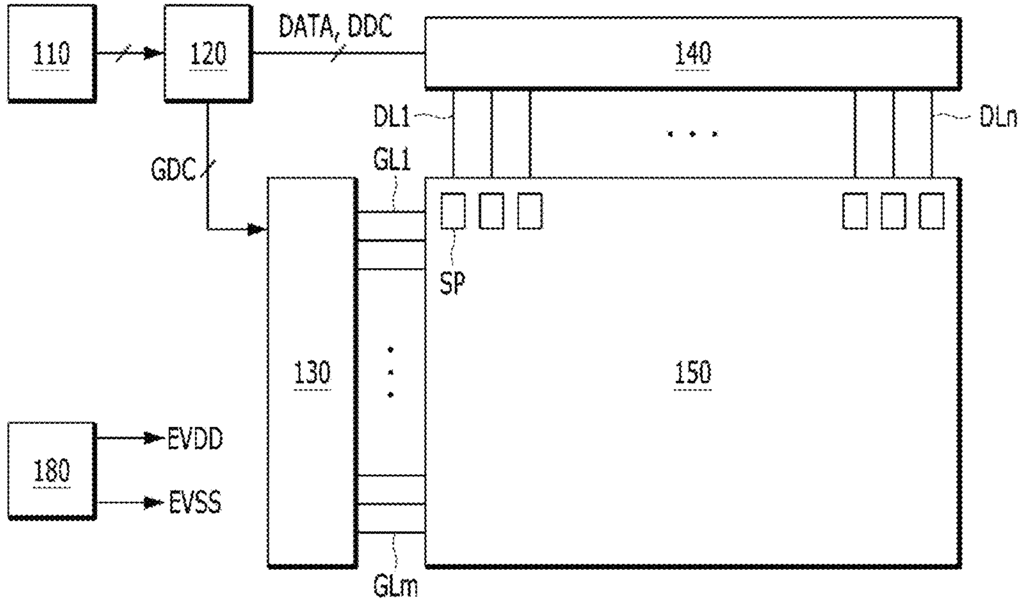
FIG. 1 is a block diagram schematically illustrating a light-emitting diode (LED) device according to one embodiment.
Figure 2:
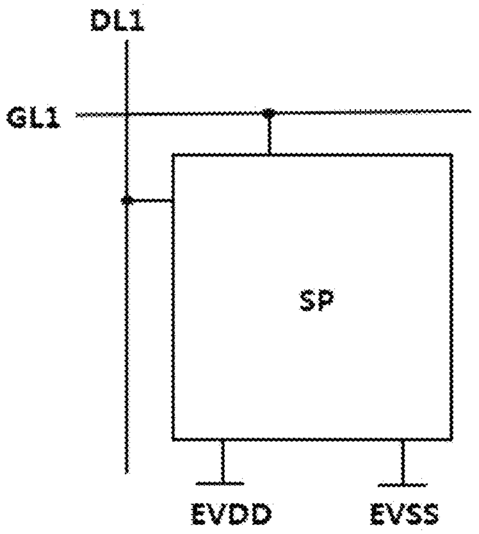
FIG. 2 is a configuration diagram schematically illustrating a sub-pixel illustrated in FIG. 1 according to one embodiment.
Figure 3:
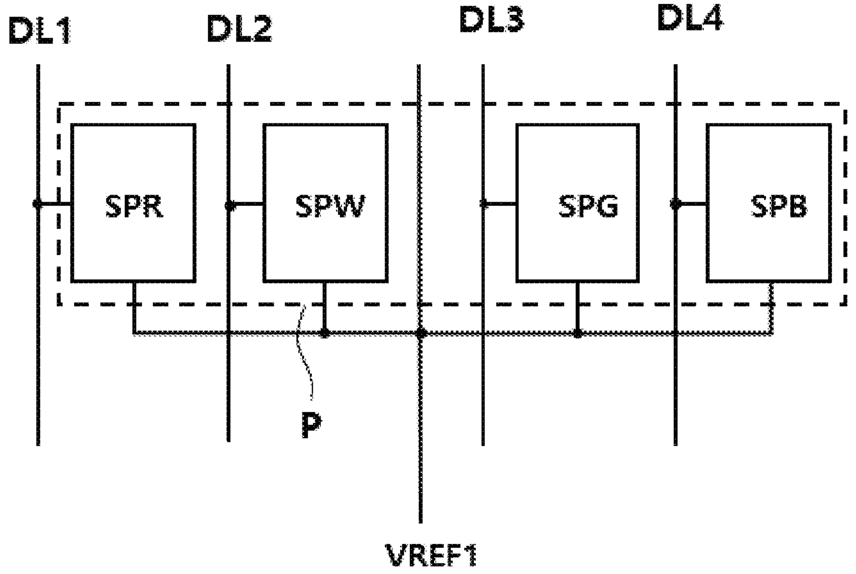
FIG. 3 is an exemplary diagram of a pixel including sub-pixels according to one embodiment.

FIG. 1 is a block diagram schematically illustrating an LED device, FIG. 2 is a configuration diagram of a sub-pixel illustrated in FIG. 1, and FIG. 3 is an exemplary diagram of a pixel including sub-pixels according to one embodiment of the present disclosure.

As illustrated in FIGS. 1 to 3, the LED device may include an image supply 110, a timing controller 120, a scan driver 130, a data driver 140, a display panel 150, and a power supply 180.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, and various synchronization signals (a vertical synchronization signal Vsync and a horizontal synchronization signal Hsync). The timing controller 120 may supply a data signal DATA supplied from the image supply 110 together with the data timing control signal DDC to the data driver 140. The timing controller 120 may take the form of an integrated circuit (IC) and mounted on a printed circuit board, but is not limited thereto.

The scan driver 130 may output a scan signal (or scan voltage) in response to the gate timing control signal GDC supplied from the timing controller 120. The scan driver 130 may supply the scan signal to sub-pixels included in the display panel 150 through gate lines GL1 to GLm. The scan driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the sub-pixels included in the display panel 150 through data lines DL1 to DLn. The data driver 140 may take the form of an integrated circuit (IC) and be mounted on the display panel 150 or mounted on the printed circuit board, but is not limited thereto.

The power supply 180 may generate first power having a high potential and second power having a low potential based on an external input voltage. The power supply 180 may output the first power through a first power line EVDD and output the second power through a second power line EVSS. The power supply 180 may generate and output a voltage (for example, a scan high voltage and a scan low voltage) required to drive the scan driver 130 or a voltage (for example, a drain voltage and a half-drain voltage) required to drive the data driver 140, as well as the first power and the second power.

The display panel 150 may display an image in response to a driving signal including the scan signal and the data voltage, the first power, and the second power. The sub-pixels of the display panel 150 may directly emit light. The display panel 150 may be manufactured based on a rigid or flexible substrate of glass, silicon, polyimide, etc. For example, one sub-pixel SP may be connected to a first data line DL1, a first gate line GL1, a first power line EVDD, and a second power line EVSS, and may include a pixel circuit which is composed of a switching transistor, a driving transistor, a capacitor, an organic light-emitting diode, etc.

The sub-pixel SP used in the LED device directly emits light, and thus a circuit configuration is complicated. In addition, there are various compensation circuits for compensating for deterioration of an organic light-emitting diode that emits light as well as a driving transistor that supplies driving current necessary to drive the organic light-emitting diode. Accordingly, note that the sub-pixel SP is simply illustrated in the form of a block.

The sub-pixels which emit light may include red, green and blue sub-pixels or may include red, green, blue and white sub-pixels. For example, one pixel P may include a red sub-pixel SPR connected to the first data line DL1, a white sub-pixel SPW connected to a second data line DL2, a green sub-pixel SPG connected to a third data line DL3, and a blue sub-pixel SPB connected to a fourth data line DL4. In addition, the red sub-pixel SPR, the white sub-pixel SPW, the green sub-pixel SPG, and the blue sub-pixel SPB may be commonly connected to a first reference line VREF1. The first reference line VREF1 may be used to sense deterioration of element(s) included in one of the red sub-pixel SPR, the white sub-pixel SPW, the green sub-pixel SPG, and the blue sub-pixel SPB, which will be discussed below.

Meanwhile, the timing controller 120, the scan driver 130, the data driver 140, etc., have been described as having individual configurations. However, one or more of the timing controller 120, the scan driver 130 and the data driver 140 may be integrated into one IC depending on the implementation scheme of the LED device. In addition, in the above description, the pixel P in which the red sub-pixel SPR, the white sub-pixel SPW, the green sub-pixel SPG, and the blue sub-pixel SPB are disposed in this order is illustrated as an example. However, an arrangement order and direction of sub-pixels may vary depending on the implementation scheme of the LED device.

Figure 4:
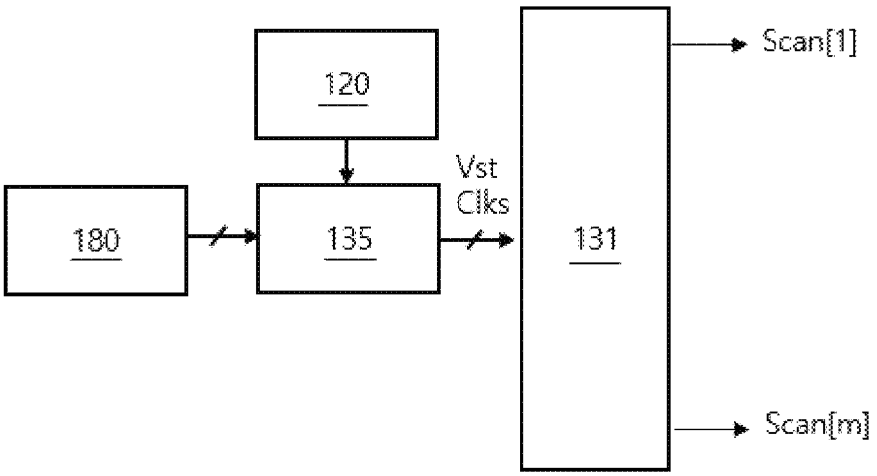
FIGS. 4 and 5 are diagrams for describing a configuration of a gate-in-panel (GIP)-type scan driver according to one embodiment.
Figure 5:
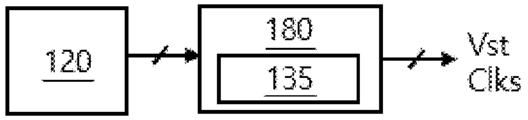
Figure 6:
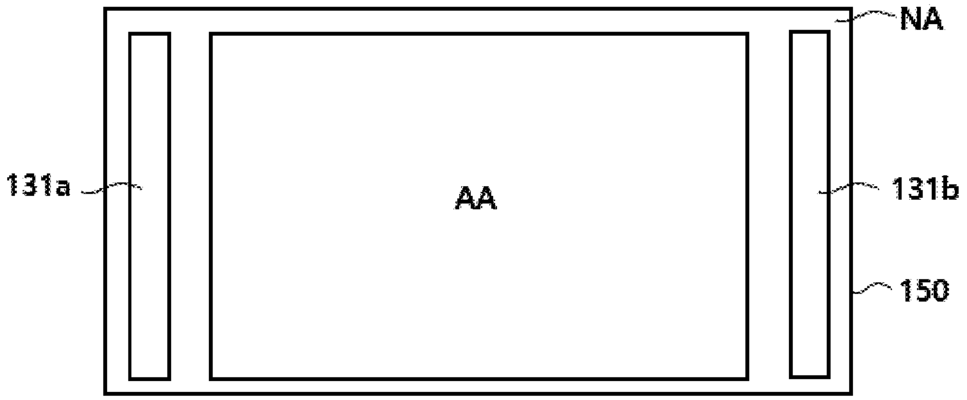
FIG. 6 is a diagram illustrating a layout example of the GIP-type scan driver according to one embodiment.

FIGS. 4 and 5 are diagrams for describing a configuration of a GIP-type scan driver according to one embodiment, and FIG. 6 is a diagram illustrating a layout example of the GIP-type scan driver according to one embodiment.

As illustrated in FIG. 4, the GIP-type scan driver may include a shift register 131 and a level shifter 135. The level shifter 135 may generate driving clock signals Clks and a start signal Vst based on signals and voltages output from the timing controller 120 and the power supply 180.

The shift register 131 may operate based on the signals Clks and Vst output from the level shifter 135 and output scan signals Scan[1] to Scan[m] capable of turning on or off transistors formed on the display panel. The shift register 131 may be formed on the display panel in the form of a thin film in a GIP manner.

As illustrated in FIGS. 4 and 5, unlike the shift register 131, the level shifter 135 may independently take the form of an IC or may be included in the power supply 180. However, this is merely one example, and the level shifter 135 is not limited thereto.

As illustrated in FIG. 6, in the GIP-type scan driver, shift registers 131*a* and 131*b* for outputting scan signals may be disposed in a non-display area NA of the display panel 150. An example in which the shift registers 131*a* and 131*b* are disposed in the non-display area NA on the left and right sides is given. However, the shift registers 131*a* and 131*b* may be disposed in the non-display area NA on upper and lower sides of the display panel 150, and may be disposed in a display area AA of the display panel 150.

Figure 7:
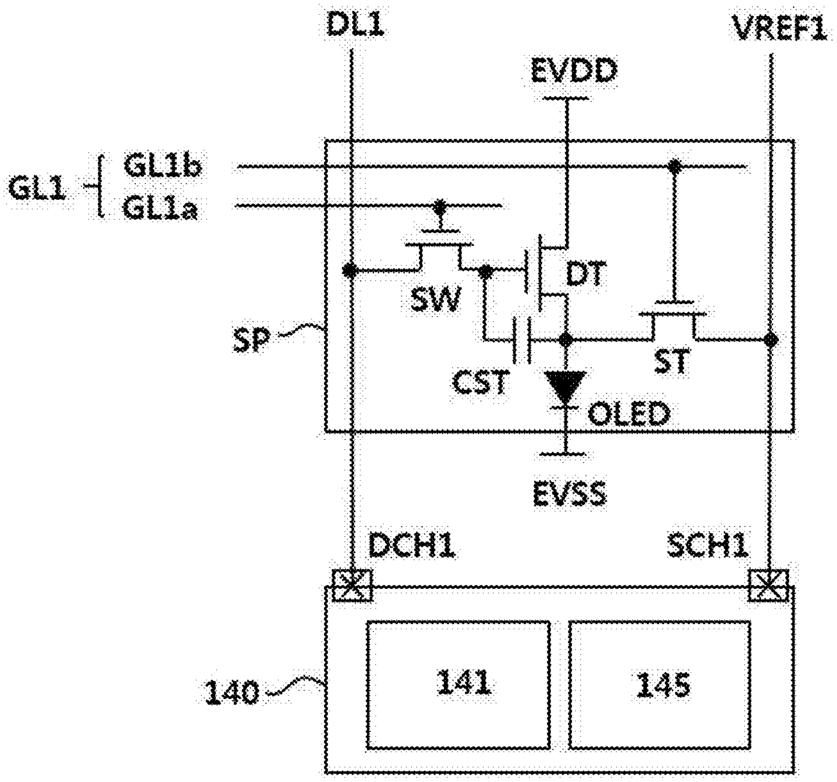
FIGS. 7 and 8 are exemplary diagrams each illustrating a sub-pixel and a data driver according to a first embodiment of the present disclosure.
Figure 8:
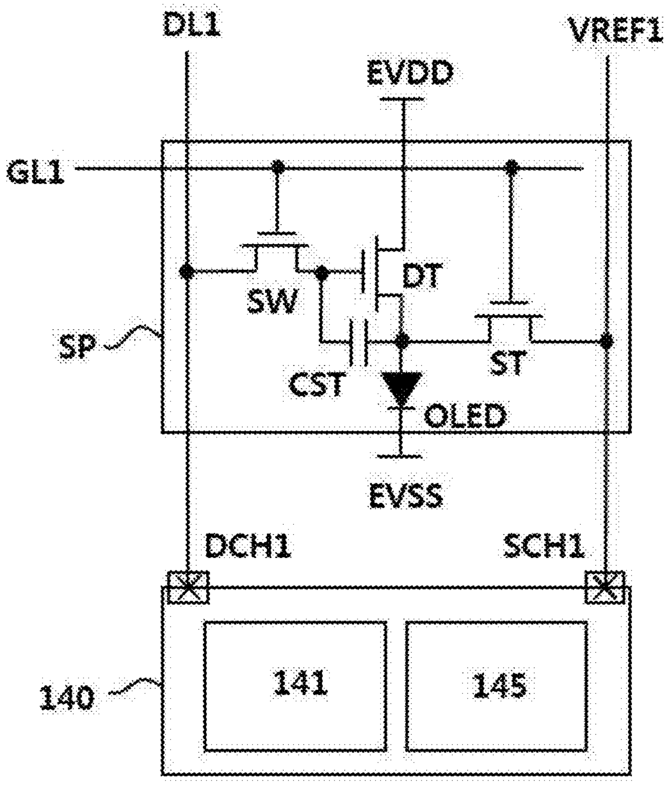

FIGS. 7 and 8 are exemplary diagrams illustrating a sub-pixel and a data driver according to a first embodiment of the present disclosure.

As illustrated in FIGS. 7 and 8, one sub-pixel SP may include a switching transistor SW, a driving transistor DT, a sensing transistor ST, a capacitor CST, and an organic light-emitting diode OLED.

The driving transistor DT may have a gate electrode connected to a first electrode of the capacitor CST, a first electrode connected to the first power line EVDD, and a second electrode connected to an anode of the organic light-emitting diode OLED. The capacitor CST may have the first electrode connected to the gate electrode of the driving transistor DT and a second electrode connected to the anode of the organic light-emitting diode OLED. The organic light-emitting diode OLED may have the anode connected to the second electrode of the driving transistor DT and a cathode connected to the second power line EVSS.

The switching transistor SW may have a gate electrode connected to a first scan line GL1*a* included in the first gate line GL1, a first electrode connected to the first data line DL1, and a second electrode connected to the gate electrode of the driving transistor DT. The sensing transistor ST may have a gate electrode connected to a second scan line GL1*b* included in the first gate line GL1, a first electrode connected to the first reference line VREF1, and a second electrode connected to the anode of the organic light-emitting diode OLED.

The sensing transistor ST is a type of compensation circuit which is additionally provided to compensate for deterioration (in a threshold voltage, mobility, etc.) of the driving transistor DT or organic light-emitting diode OLED. The sensing transistor ST may enable physical threshold voltage sensing based on a source follower operation of the driving transistor DT. The sensing transistor ST may operate to acquire a sensed value through a sensing node defined between the driving transistor DT and the organic light-emitting diode OLED.

Meanwhile, the first gate line GL1 may be integrated into one gate line as illustrated in FIG. 8 without being divided into the first scan line GL1*a* and the second scan line GL1*b* as illustrated in FIG. 7. That is, the switching transistor SW and the sensing transistor ST may be connected in common to the first gate line GL1 and turned on or off at the same time.

The data driver 140 may include a panel driving circuit unit 141 for driving the sub-pixel SP and a panel sensing circuit unit 145 for sensing the sub-pixel SP. The panel driving circuit unit 141 may be connected to the first data line DL1 through a first output channel DCH1 and connected to the first reference line VREF1 through a first sensing channel SCH1. The panel driving circuit unit 141 may output a data voltage for driving the sub-pixel SP, etc. through the first output channel DCH1. The panel sensing circuit unit 145 may acquire a sensing voltage sensed from the sub-pixel SP through the first sensing channel SCH1.

Figure 9:
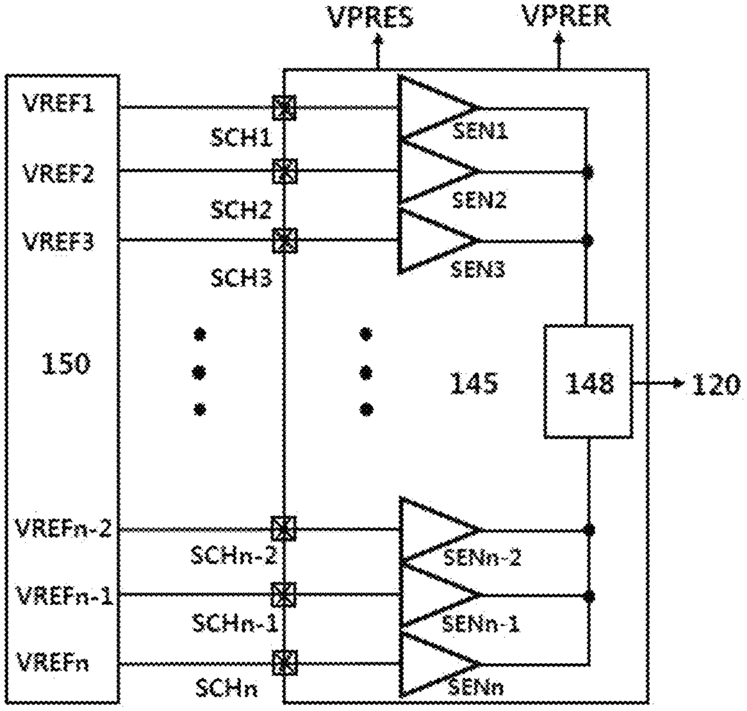
FIGS. 9 and 10 are diagrams each schematically illustrating a configuration of a panel sensing circuit unit included in the data driver according to the first embodiment of the present disclosure.
Figure 10:
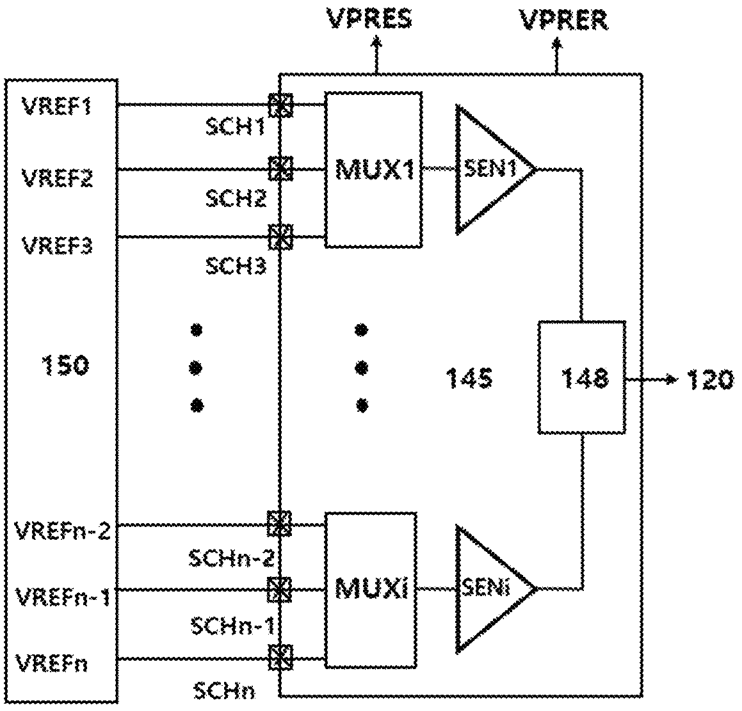

FIGS. 9 and 10 are diagrams each schematically illustrating a configuration of the panel sensing circuit unit 145 included in the data driver 140 according to the first embodiment of the present disclosure.

As illustrated in FIG. 9, the panel sensing circuit unit 145 may include a plurality of sensing channels SCH1 to SCHn corresponding to the number of reference lines VREF1 to VREFn formed on the display panel 150. The panel sensing circuit unit 145 may include a plurality of sensing circuit units SEN1 to SENn (e.g., buffer circuits) corresponding to the number of sensing channels SCH1 to SCHn. The panel sensing circuit unit 145 may include a sensing voltage output unit 148 (e.g., a circuit) that acquires sensing voltages output from the plurality of sensing circuit units SEN1 to SENn, and transmits the sensing voltages to the timing controller 120. For example, the sensing voltage output circuit 148 may include an ADC that can output an analog voltage as a digital signal.

As illustrated in FIG. 10, the panel sensing circuit unit 145 may include a plurality of sensing channels SCH1 to SCHn corresponding to the number of reference lines VREF1 to VREFn formed on the display panel 150. The panel sensing circuit unit 145 may include a plurality of switch circuit units (multiplexers) MUX1 to MUXi that output sensing voltages acquired from the plurality of sensing channels SCH1 to SCHn in a time division manner. The panel sensing circuit unit 145 may include a plurality of sensing circuit units SEN1 to SENi corresponding to the number of switch circuit units MUX1 to MUXi. The panel sensing circuit unit 145 may include a sensing voltage output unit 148 that acquires sensing voltages output from the plurality of sensing circuit units SEN1 to SENn, and transmits the sensing voltages to the timing controller 120.

FIG. 9 described above is a scheme in which the reference lines VREF1 to VREFn, the sensing channels SCH1 to SCHn, and the sensing circuit units SEN1 to SENn are implemented in a format of n:n:n. Here, n may be a natural number of 6 or greater. FIG. 10 described later is a scheme in which the reference lines VREF1 to VREFn, the sensing channels SCH1 to SCHn, and the sensing circuit units SEN1 to SENn are implemented in a format of 1:i:i. Here, i may be a natural number smaller than n. Meanwhile, even though the reference lines VREF1 to VREFn, the sensing channels SCH1 to SCHn, and the sensing circuit units SEN1 to SENn are illustrated and described in the format of 1:i:i in FIG. 10, implementation thereof in a format of 1:i:f is possible. Here, f may be a natural number smaller than i. The scheme illustrated in FIG. 10 may simplify the configuration of the panel sensing circuit unit 145 required for sensing compared to FIG. 9.

As illustrated in FIGS. 9 and 10, the panel sensing circuit unit 145 may selectively charge the reference lines VREF1 to VREFn with voltages based on a first reference voltage source VPRES and a second reference voltage source VPRER, which is discussed below.

Figure 11:
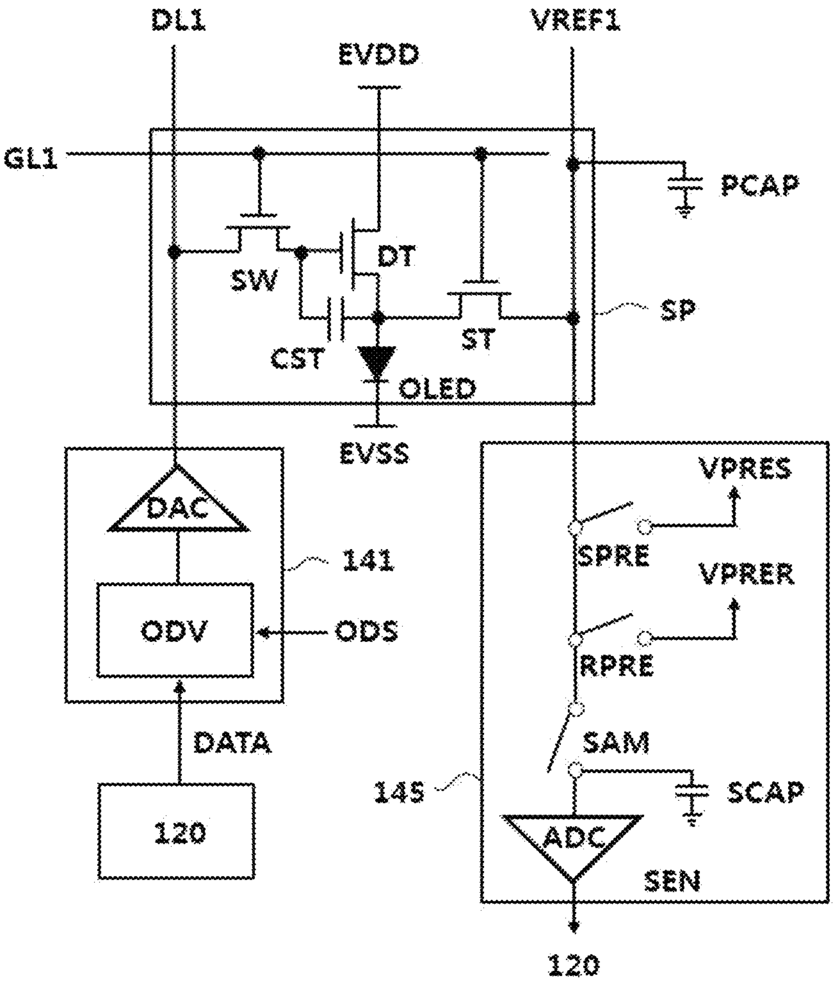
FIG. 11 is a diagram more specifically illustrating a configuration of a panel driving circuit unit and the panel sensing circuit unit included in the data driver according to the first embodiment of the present disclosure.
Figure 12:
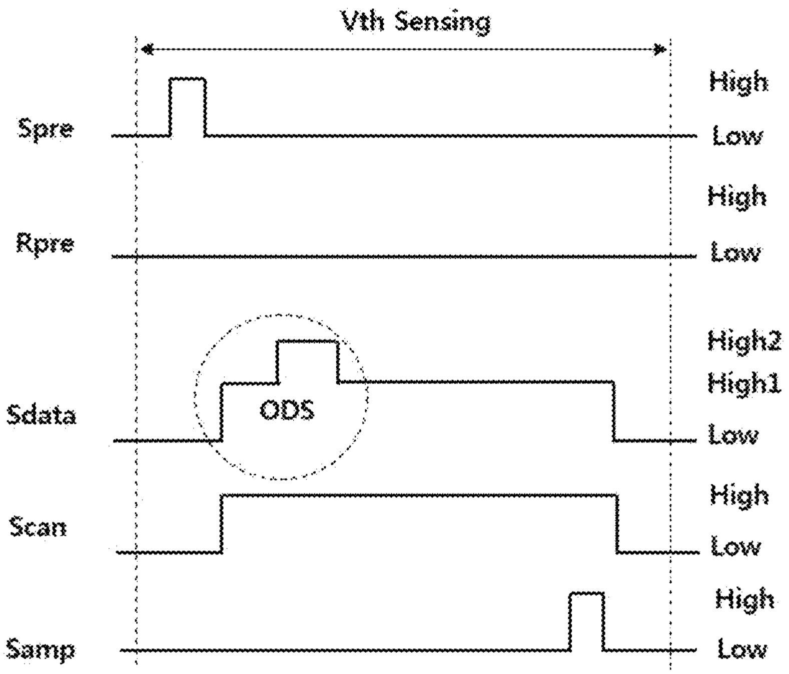
FIGS. 12 and 13 are waveform diagrams for describing a sensing data voltage according to the first embodiment of the present disclosure.
Figure 13:
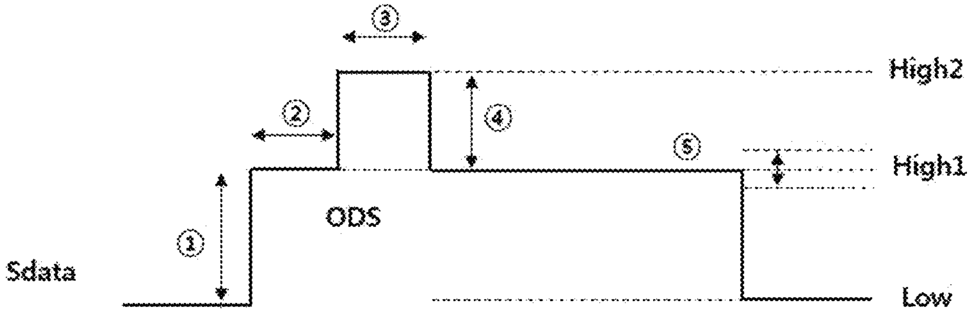

FIG. 11 is a diagram more specifically illustrating a configuration of the panel driving circuit unit 141 and the panel sensing circuit unit 145 included in the data driver 140 according to the first embodiment of the present disclosure, and FIGS. 12 and 13 are waveform diagrams for describing a sensing data voltage according to the first embodiment of the present disclosure.

As illustrated in FIGS. 11 to 13, the panel driving circuit unit 141 may include a digital-to-analog converter DAC and an overdriving voltage output unit ODV (e.g., a circuit) to output a sensing data voltage Sdata, a black data voltage, or a display data voltage. The panel driving circuit unit 141 of FIG. 11 may correspond to a circuit in charge of one output channel.

The digital-to-analog converter DAC may output the sensing data voltage Sdata, the black data voltage, or the display data voltage based on the data signal DATA output from the timing controller 120. The overdriving voltage output unit ODV may additionally write a voltage (adjust a voltage upward) so that the sensing data voltage Sdata includes an overdriving voltage ODS. The overdriving voltage output unit ODV may write the overdriving voltage ODS to the sensing data voltage Sdata based on the overdriving signal ODS. The overdriving signal ODS may be output from the timing controller 120 or may be generated in the panel driving circuit 141 at predetermined intervals. A description of writing the overdriving voltage ODS to the sensing data voltage Sdata will be described below.

The panel sensing circuit unit 145 may include a sensing circuit unit SEN, etc. including a first voltage circuit unit SPRE (e.g., a first switch), a second voltage circuit unit RPRE (e.g., a second switch), a sampling circuit unit SAM (e.g., a third switch), and an analog-to-digital converter ADC to output a voltage to the sub-pixel SP and the first reference line VREF1 and perform sensing. In one embodiment, the first voltage circuit unit SPRE could be considered a first switch or a second switch, and the sampling circuit unit SAM could be considered the other one of the first switch or the second switch. The panel sensing circuit unit 145 of FIG. 11 may correspond to a circuit in charge of one sensing channel.

The first voltage circuit unit SPRE and the second voltage circuit unit RPRE may each perform a voltage output operation for initializing a node or circuit included in the sub-pixel SP or charging the node or circuit with a voltage at a specific level. The first voltage circuit unit SPRE and the second voltage circuit unit RPRE may include the first reference voltage source VPRES and the second reference voltage source VPRER, respectively. The first voltage circuit unit SPRE may output a first reference voltage based on the first reference voltage source VPRES, and the second voltage circuit unit RPRE may output a second reference voltage based on the second reference voltage source VPRER. The reference voltage output by the first voltage circuit unit SPRE may be considered a first reference voltage or a second reference voltage and the reference voltage output by the second voltage circuit unit RPRE maybe considered the other one of the first reference voltage or the second reference voltage. The reference voltage output by the first voltage circuit unit SPRE may be defined as a voltage used in a sensing mode (compensation mode) for deterioration compensation, and the reference voltage output by the second voltage circuit unit RPRE may be defined as a voltage used in a driving mode (normal mode) for image display. In addition, the first reference voltage may be set to a voltage lower than the second reference voltage. The sampling circuit unit SAM may perform a sampling operation to obtain a sensing voltage through the first reference line VREF1. The analog-to-digital converter ADC may convert an analog sensing voltage acquired by the sampling circuit unit SAM into a digital sensing voltage, and output the converted sensing voltage.

The panel sensing circuit unit 145 may acquire a sensing voltage for compensating for deterioration of the driving transistor DT or the organic light-emitting diode OLED included in the sub-pixel SP through a sensing capacitor PCAP formed on the first reference line VREF1. The panel sensing circuit unit 145 may acquire a sensing voltage through the sampling capacitor SCAP formed in the sampling circuit unit SAM, convert the acquired analog sensing voltage into a digital sensing voltage through the analog-to-digital converter ADC, and output the converted sensing voltage. The sensing voltage output from the panel sensing circuit unit 145 may be transferred to the timing controller 120. Further, the timing controller 120 may determine whether or not the driving transistor DT or the organic light-emitting diode OLED included in the sub-pixel SP deteriorates based on the sensing voltage, and perform a compensation operation to compensate for the deterioration.

The LED device implemented according to the first embodiment of the present disclosure may operate in a driving mode (normal mode) for displaying an image on the display panel based on the panel driving circuit unit 141 and the panel sensing circuit unit 145 and a sensing mode (compensation mode) for sensing the characteristics of the element(s) included in the display panel.

In the sensing mode, sensing may be performed to compensate for deterioration of the driving transistor DT (threshold voltage or mobility compensation) or to compensate for deterioration of the organic light-emitting diode OLED (threshold voltage compensation). FIG. 12 is an example of a threshold voltage sensing operation of the driving transistor DT.

Operations of the devices performed in a threshold voltage sensing period Vth Sensing of the driving transistor DT will be described below. A switch included in the first voltage circuit unit SPRE may be turned on to output the first reference voltage through the first reference line VREF1 in response to the first voltage control signal Spre at a high voltage. The switching transistor SW and the sensing transistor ST may be turned on in response to a scan signal Scan at a high voltage.

The digital-to-analog converter DAC may operate together with the overdriving voltage output unit ODV to output the sensing data voltage Sdata including the overdriving voltage ODS through the first data line DL1. In addition, a sampling switch included in the sampling circuit unit SAM may be temporarily turned on in response to the sampling control signal Samp at a high voltage.

As illustrated in FIGS. 11 and 13, the overdriving voltage ODS included in the sensing data voltage Sdata may include a first overdriving voltage High1 and a second overdriving voltage High2. That is, the overdriving voltage ODS may be formed to have at least two stepped high voltage (High1 and High2) levels. Here, ⑤ may be defined as a voltage level for sensing a threshold voltage of the driving transistor DT.

The first overdriving voltage High1 may be defined as a precharge voltage used to consider or prevent coupling between the data line and the reference line, and the second overdriving voltage High 2 may be defined as an overdriving voltage used to reduce a sensing time. The first overdriving voltage High1 may have a first high voltage level, and the second overdriving voltage High2 may have a second high voltage level that is greater than the first high voltage level. Here, reducing the sensing time may mean that a condition necessary for sensing is rapidly created.

In the first overdriving voltage High1, ① may be defined as a precharge voltage level, and ② may be defined as a time (or duty) during which the precharge voltage is applied. Since the first overdriving voltage High1 corresponds to a voltage used to consider or prevent coupling between the data line and the reference line, the voltage level and application time may be varied in response to coupling therebetween. However, when coupling between the data line and the reference line does not occur, the first overdriving voltage High1 may be omitted.

In the second overdriving voltage High2, ④ may be defined as an overdriving voltage level, and ③ may be defined as a time (or duty) during which the second overdriving voltage High2 is applied. Since the second overdriving voltage High2 corresponds to a voltage used to reduce a sensing time, the voltage level and application time may be varied in response to a degree of deterioration of an object to be sensed.

The time during which the first overdriving voltage High1 is applied and the time during which the second overdriving voltage High 2 is applied may be set to 1:1→2:1→3:1, etc. That is, the time during which the first overdriving voltage High1 is applied may be set to be equal to or longer than the time during which the second overdriving voltage High2 is applied.

Meanwhile, the overdriving voltage level ④ may be determined as the voltage level ⑤ for sensing the threshold voltage of the driving transistor DT×gain value. In this instance, as the overdriving voltage level ④ increases, a slope of the sensing voltage may increase. However, ripple may be caused by overshoot.

Therefore, the overdriving voltage level ④ may swing with the voltage level ⑤ for sensing the threshold voltage of the driving transistor DT×gain value located between 1 and 2, and an adjustment value considering a degree of ripple generation may be prepared. Accordingly, the voltage level ⑤ for sensing the threshold voltage of the driving transistor DT may be increased or decreased to a level corresponding to the first overdriving voltage High1, a lower level, or a higher level. Therefore, the overdriving voltage ODS may be generated to be applied at an appropriate level and for an appropriate time through a process of tracking characteristics of the display panel.

Figure 14:
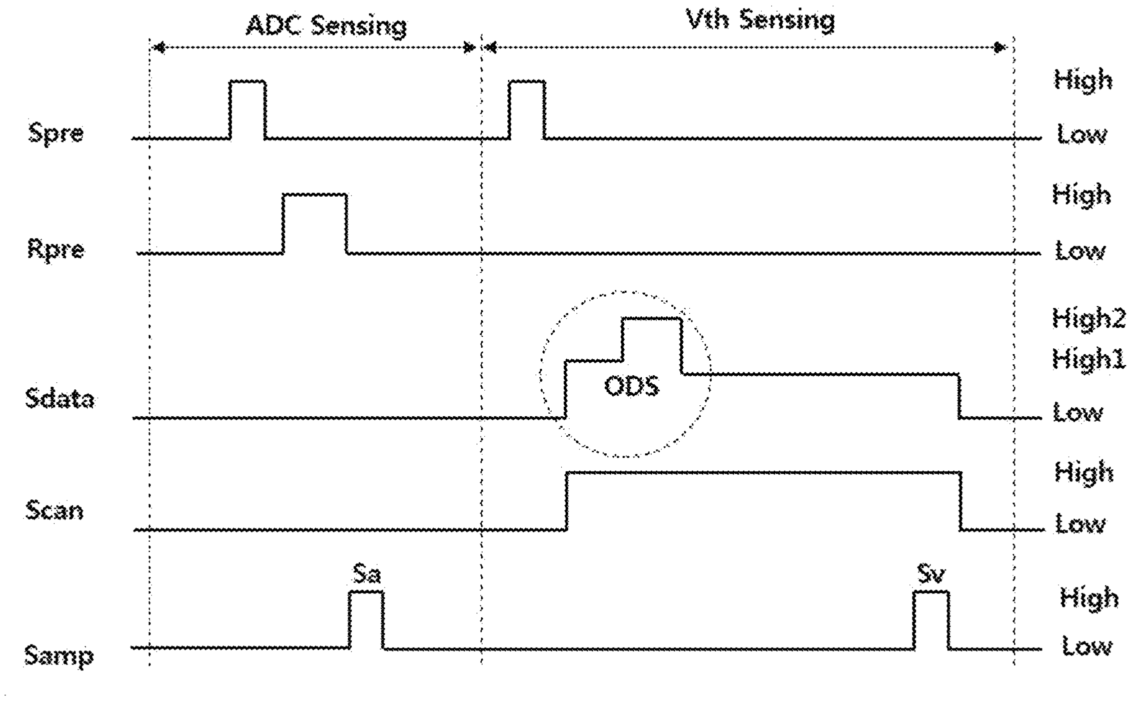
FIG. 14 is a waveform diagram for describing a sensing scheme according to the first embodiment of the present invention.
Figure 15:
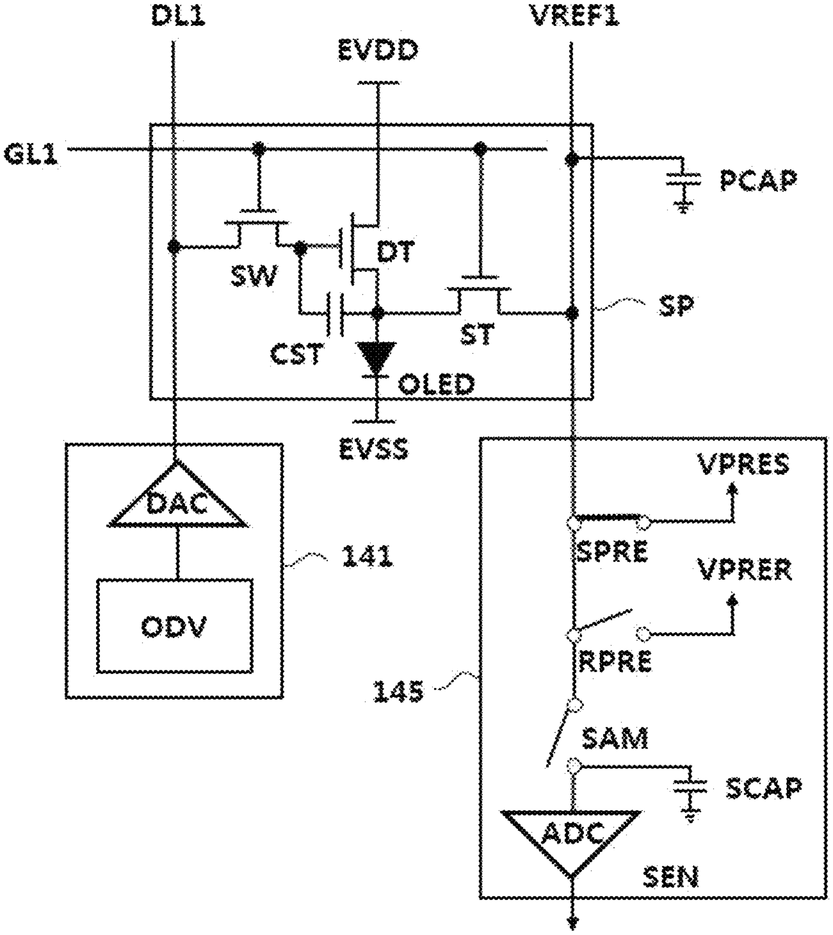
FIGS. 15 to 17 are diagrams illustrating operation of a panel driving circuit unit and the panel sensing circuit unit included in the data driver according to the first embodiment of the present disclosure.
Figure 16:
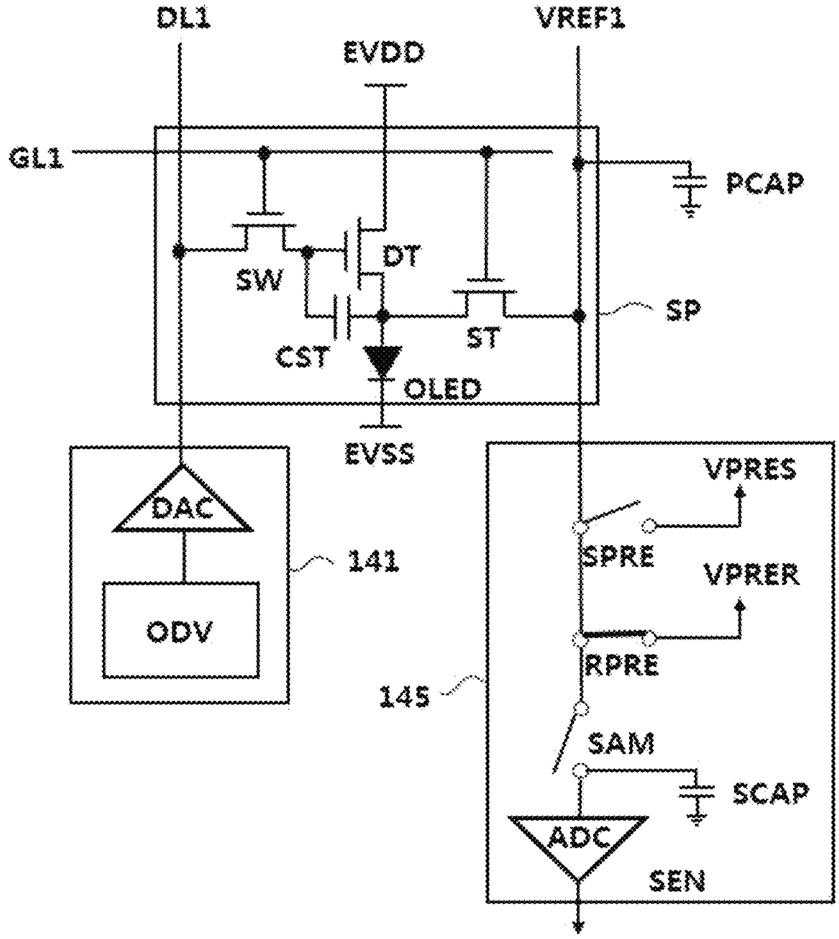
Figure 17:
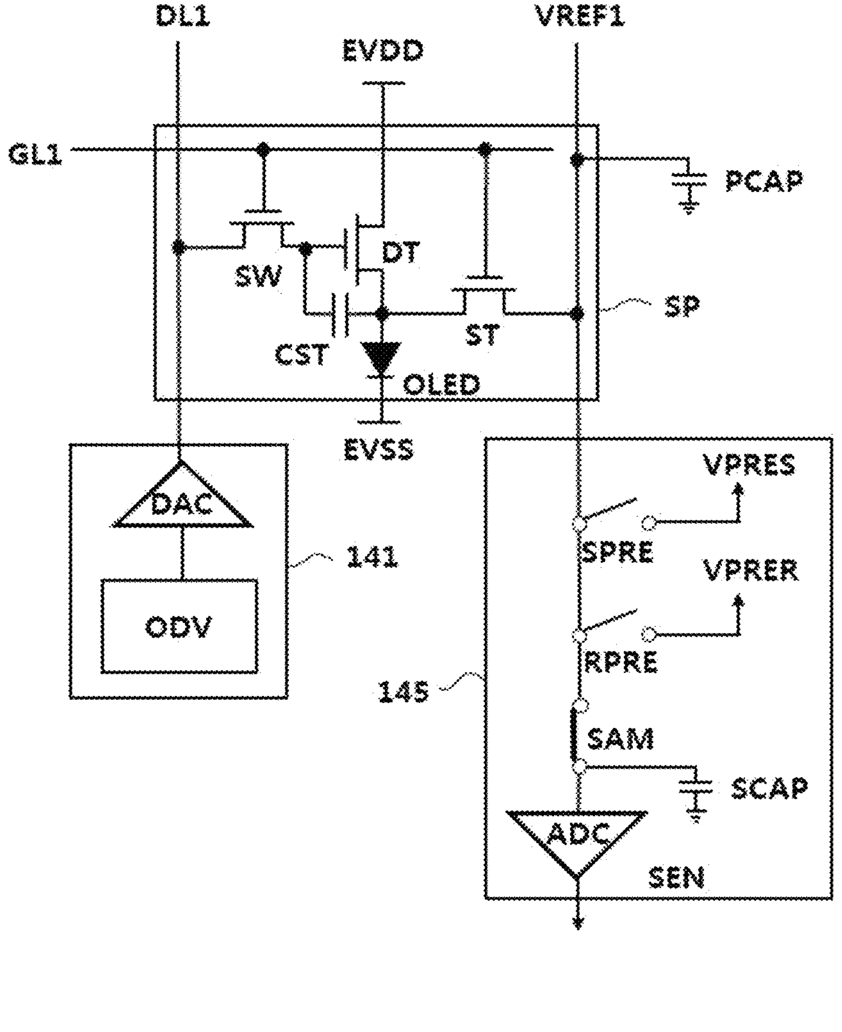
Figure 18:
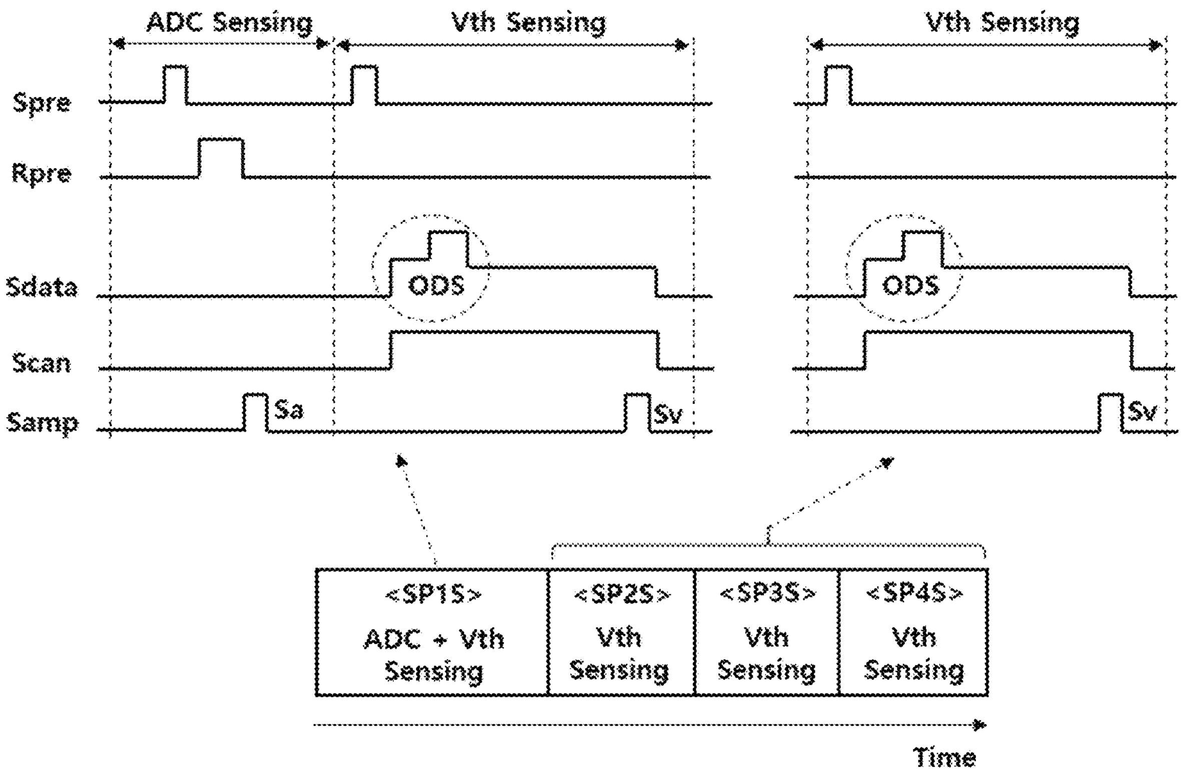
FIGS. 18 and 19 are diagrams for describing sensing priority according to the first embodiment of the present disclosure.
Figure 19:
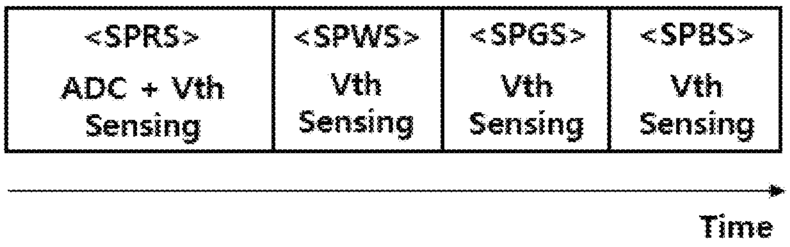

FIG. 14 is a waveform diagram for describing a sensing scheme according to the first embodiment of the present disclosure. FIGS. 15 to 17 are diagrams illustrating operation of a panel driving circuit unit and the panel sensing circuit unit included in the data driver according to the first embodiment of the present disclosure. FIGS. 18 and 19 are diagrams for describing sensing priority according to the first embodiment of the present disclosure.

As illustrated in FIGS. 14 to 17, according to the first embodiment of the present disclosure, a time required for the threshold voltage sensing period Vth Sensing of the driving transistor DT may be reduced. According to the first embodiment of the present disclosure, as described above, the time required for sensing may be reduced, and a sensing period ADC Sensing for offset correction of the analog-to-digital converter ADC may be provided therebefore.

Operations of the devices performed in the sensing period ADC Sensing for offset correction of the analog-to-digital converter ADC will be described below. The switch included in the first voltage circuit unit SPRE may be turned on to output the first reference voltage through the first reference line VREF1 in response to the first voltage control signal Spre at the high voltage. At this time, operating states of the devices are understood with reference to FIG. 15. The first reference voltage from the first voltage circuit unit SPRE may be used as a voltage for initializing the first reference line VREF1 which charges the sensing capacitor PCAP according to the first reference voltage.

A switch included in the second voltage circuit unit RPRE may be turned on to output the second reference voltage through the first reference line VREF1 in response to a second voltage control signal Rpre at a high voltage. At this time, operating states of the devices are understood with reference to FIG. 16. The second reference voltage from the second voltage circuit unit RPRE may be used as a voltage for offset correction of the analog-to-digital converter ADC which charges the sensing capacitor PCAP according to the second reference voltage.

After the first reference line VREF1 is initialized by the first reference voltage output from the first voltage circuit unit SPRE, the second voltage circuit unit RPRE may output the second reference voltage for offset correction of the analog-to-digital converter ADC. That is, after the first reference voltage is output, the second reference voltage may be output. The sensing capacitor PCAP is charged according to the first reference voltage and the second reference voltage.

The switching transistor SW and the sensing transistor ST may be turned off in response to the scan signal Scan at a low voltage during the sensing period ADC. The digital-to-analog converter DAC may not output the sensing data voltage Sdata, etc. That is, during the sensing period ADC Sensing for offset correction of the analog-to-digital converter ADC, voltages or signals related to operations of the sub-pixels may not be generated (a non-output state).

The sampling switch included in the sampling circuit unit SAM may be temporarily turned on in response to the sampling control signal Samp at a high voltage. At this time, operating states of the devices are understood with reference to FIG. 17. The sampling circuit unit SAM may be turned on for sensing after the second reference voltage is output from the second voltage circuit unit RPRE for offset correction of the analog-to-digital converter ADC. The sensing voltage obtained by the sampling circuit unit SAM that is stored in the sensing capacitor PCAP may be used for offset correction of the analog-to-digital converter ADC.

Meanwhile, the sampling control signal Samp at a high voltage applied to the sampling circuit SAM during the sensing period ADC Sensing for offset correction of the analog-to-digital converter ADC may be referred to as a sampling control signal Sa for offset correction. While the sampling control signal Samp is at the high voltage during the sensing period ADC Sensing, the analog-to-digital converter ADC converts the sensed voltage stored in the sensing capacitor PCAP to a digital signal. Given that the first reference voltage and second reference voltage are known voltages, the digital signal may be analyzed by the timing controller 120 to determine whether the digital signal output by the analog-to-digital converter ADC is the expected digital signal and perform offset correction of the ADC responsive to the digital signal deviating (e.g., not matching) from the expected digital signal. Further, the sampling control signal Samp at a high voltage applied to the sampling circuit SAM during the threshold voltage sensing period Vth Sensing of the driving transistor DT thereafter may be referred to as a sampling control signal SV for threshold voltage compensation. In addition, the sensing period ADC Sensing for offset correction of the analog-to-digital converter ADC may be referred to as a first sensing period, and the threshold voltage sensing period Vth Sensing of the driving transistor DT may be referred to as a second sensing period.

As illustrated in FIG. 18, the sensing scheme according to the first embodiment of the present disclosure includes a first sub-pixel sensing period SP1S, a second sub-pixel sensing period SP2S, a third sub-pixel sensing period SP3S, and a fourth sub-pixel sensing period SP4S. However, the sensing period of FIG. 18 is an example in which one pixel included in the display panel has four different colors.

The first sub-pixel sensing period SP1S, the second sub-pixel sensing period SP2S, the third sub-pixel sensing period SP3S, and the fourth sub-pixel sensing period SP4S may include in common the threshold voltage sensing period Vth Sensing of the driving transistor DT included in each sub-pixel. Further, a first sensing period on a time axis Time such as the first sub-pixel sensing period SP1S may further include a sensing period ADC+Vth Sensing for offset correction of the analog-to-digital converter ADC.

However, this is merely one example, and the sensing period ADC Sensing for offset correction of the analog-to-digital converter ADC may be included in at least one of the first sub-pixel sensing period SP1S, the second sub-pixel sensing period SP2S, the third sub-pixel sensing period SP3S, and the fourth sub-pixel sensing period SP4S.

In addition, when the time required for sensing can be greatly reduced, the sensing period ADC Sensing for offset correction of the analog-to-digital converter ADC may be included in all the first sub-pixel sensing period SP1S to the fourth sub-pixel sensing period SP4S.

As illustrated in FIG. 19, when a sensing order according to the first embodiment of the present disclosure is viewed on the time axis Time, it can be seen that sensing is performed in the order of a red sub-pixel sensing period SPRS, a white sub-pixel sensing period SPWS, a green sub-pixel sensing period SPGS, and a blue sub-pixel sensing period SPBS.

However, the sensing order may be changed based on prior information (sensing data or experimental data) on deterioration characteristics of sub-pixels, etc. In addition, the sensing order may be changed for each frame. For example, in a first frame, the red sub-pixel sensing period SPRS may be performed first, and sensing for offset correction of the analog-to-digital converter ADC and threshold voltage sensing of the driving transistor DT may be performed together. Further, in a second frame, the white sub-pixel sensing period SPWS may be performed first, and sensing for offset correction of the analog-to-digital converter ADC and threshold voltage sensing of the driving transistor DT may be performed together.

Figure 20:
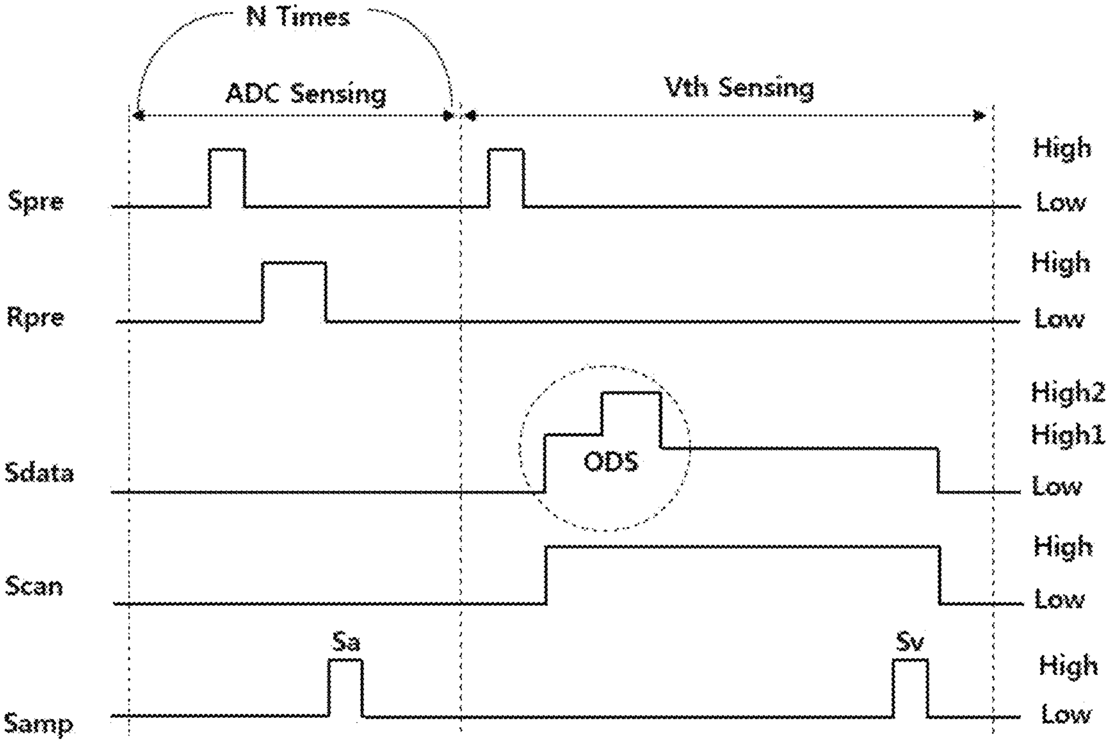
FIG. 20 is a waveform diagram for describing a sensing scheme according to a second embodiment of the present disclosure.

FIG. 20 is a waveform diagram for describing a sensing scheme according to a second embodiment of the present disclosure.

As illustrated in FIG. 20, according to the sensing scheme according to the second embodiment of the present disclosure, the sensing period ADC Sensing for offset correction of the analog-to-digital converter ADC may be repeated N times (N being an integer equal to or greater than 2). That is, the sensing period ADC Sensing for offset correction of the analog-to-digital converter ADC may be repeated N times before the threshold voltage sensing period Vth Sensing of the driving transistor DT. In this way, when the sensing period ADC Sensing for offset correction of the analog-to-digital converter ADC is performed a plurality of times, it is possible to increase a deviation correction rate (measurement deviation reduction) between channels.

Figure 21:
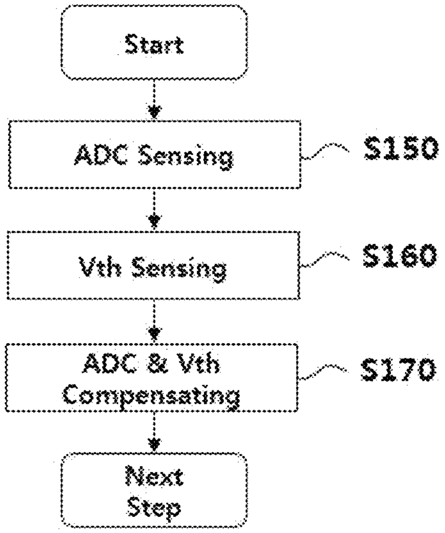
FIGS. 21 and 22 are flowcharts for describing a sensing scheme according to a third embodiment of the present disclosure.
Figure 22:
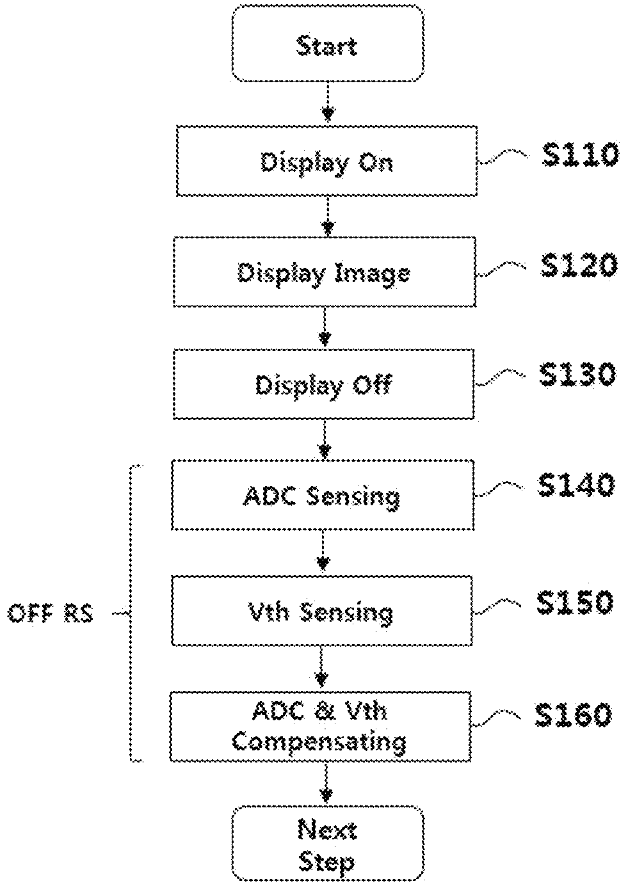

FIGS. 21 and 22 are flowcharts for describing a sensing scheme according to a third embodiment of the present disclosure.

The sensing scheme according to the third embodiment of the present disclosure may use the sensing scheme according to the first embodiment or the sensing scheme according to the second embodiment described above.

As illustrated in FIG. 21, according to the sensing scheme of the third embodiment of the present invention, first, a first sensing operation (ADC Sensing, S150) (or first sensing period) for offset correction of the analog-to-digital converter ADC may be performed. Next, a second sensing operation (Vth Sensing, S160) (or second sensing period) for threshold voltage compensation of the driving transistor DT may be performed. Next, an operation for offset correction of the analog-to-digital converter ADC and threshold voltage compensation of the driving transistor DT (ADC &

Vth Compensating, S170) may be performed. Thereafter, when the operation for offset correction of the analog-to-digital converter ADC and threshold voltage compensation of the driving transistor DT (ADC & Vth Compensating, S170) is completed, a process of reflecting the completed operation in a device or a memory or updating the device or the memory with the completed operation may be performed in a next step.

As illustrated in FIG. 22, after the display panel is turned on (Display On, S110) by an operation of a user, an image may be displayed on the display panel (Display Image, S120). In addition, after the display panel is turned off (Display Off, S130) by an operation of the user, off compensation for the display panel (OFF RS, S140 to S160) may be performed. The off compensation for the display panel (OFF RS, S140 to S160) may include the first sensing operation (ADC Sensing, S150), the second sensing operation (Vth Sensing, S160), and the compensation operation (ADC & Vth Compensating, S170). Thereafter, when the off compensation for the display panel (OFF RS, S140 to S160) is completed, a process of reflecting the completed operation in a device or a memory or updating the device or the memory with the completed operation may be performed in a next step.

Figure 23:
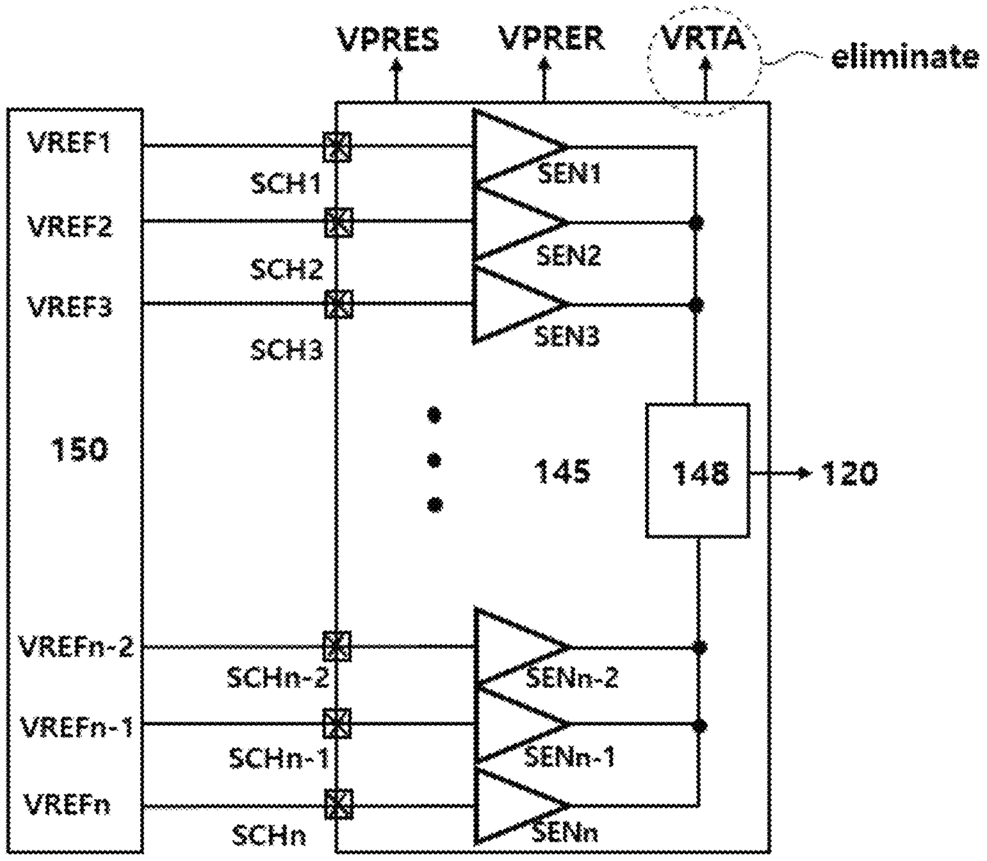
FIGS. 23 and 24 are diagrams for describing advantages according to embodiments of the present disclosure.
Figure 24:
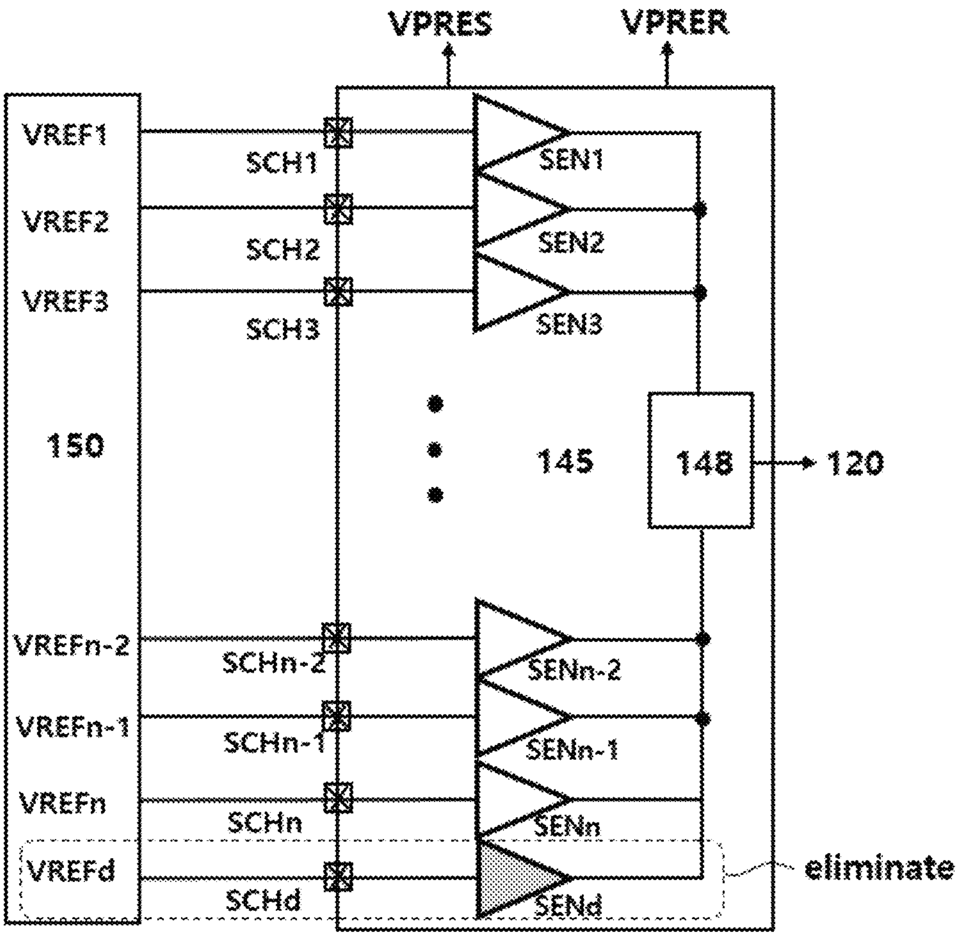

FIGS. 23 and 24 are diagrams for describing advantages according to embodiments of the present disclosure.

As illustrated in FIG. 23, according to the embodiments of the present invention, it is possible to eliminate a separate voltage source VRTA provided for offset correction of an analog-to-digital converter included in each of the sensing circuit units SEN1 to SENn.

In addition, as illustrated in FIG. 24, according to the embodiments of the present disclosure, it is possible to eliminate a separate dummy sensing circuit unit SENd, dummy sensing channel SCHd, dummy reference line VREFd, etc. provided for offset correction of the analog-to-digital converter included in each of the sensing circuit units SEN1 to SENn.

In addition, according to the embodiments of the present invention, it is possible to perform offset correction for the analog-to-digital converter included in each of the sensing circuit units SEN1 to SENn based on a circuit used for actual sensing rather than a combination of the voltage source VRTA of FIG. 23 and the dummy circuit and related components SENd, SCHd, and VREFd of FIG. 24.

As described above, the present disclosure has an effect in that it is possible to perform offset correction of an analog-to-digital converter included in each of sensing circuit units based on a circuit used for actual sensing without using a separate voltage or a separate dummy circuit. In addition, since offset correction of the analog-to-digital converter is performed based on a circuit used for actual sensing rather than a dummy circuit, the present disclosure has an effect in that compensation accuracy may be improved compared to the case of using a dummy circuit. In addition, since offset correction of the analog-to-digital converters included in all channels is possible, the present disclosure has an effect in that it is possible to reduce occurrence of a deviation between channels. In addition, since a configuration related to the separate dummy circuit may be eliminated, the present invention has an effect in that it is possible to reduce the number of channels and to simplify design of the device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device comprising:

a display panel including a sub-pixel connected to a data line and a reference line; and a data driver including a panel driving circuit and a panel sensing circuit, the panel driving circuit configured to supply a data voltage to the display panel through the data line, and the panel sensing circuit including an analog-to-digital converter (ADC) and the panel sensing circuit configured to sense the display panel through the reference line, wherein during a first sensing operation of the ADC, the panel sensing circuit is configured to supply a first reference voltage to the display panel through the reference line and convert a voltage that is sensed through the reference line in response to the first reference voltage into a digital signal using the analog-to-digital converter without the panel driving circuit supplying the data voltage during the first sensing operation, and wherein offset correction during a second sensing operation of an element included in the sub-pixel, the panel sensing circuit supplies a second reference voltage to the display panel through the reference line and the panel driving circuit supplies the data voltage to the display panel through the data line.

2. The display device according to claim 1, wherein the panel sensing circuit supplies the first reference voltage to the reference line for offset correction of the ADC.

3. The display device according to claim 2, wherein during the second sensing operation, the data voltage supplied by the panel driving circuit though the data line is a sensing data voltage for deterioration compensation of the element included in the sub-pixel, and the sensing data voltage includes an overdriving voltage comprising at least two high voltage levels that are greater than a low voltage level.

4. The display device according to claim 3, wherein the at least two high voltage levels of the overdriving voltage includes:

a first overdriving voltage having a first high voltage level; and a second overdriving voltage having a second high voltage level that is greater than the first high voltage level of the first overdriving voltage.

5. The display device according to claim 4, wherein a duration of time during which the first overdriving voltage is applied is equal to or longer than a duration of time during which the second overdriving voltage is applied.

6. The display device according to claim 1, wherein the first sensing operation is performed a plurality of times before the second sensing operation is performed.

7. The display device according to claim 1, wherein the first sensing operation is included in at least one of a period of sensing a red sub-pixel of the display panel, a period of sensing a white sub-pixel of the display panel, a period of sensing a green sub-pixel of the display panel, or a period of sensing a blue sub-pixel of the display panel.

8. A method of driving a display device including a display panel comprising a sub-pixel connected to a data line and a reference line, and a data driver including a panel driving circuit and a panel sensing circuit, the panel driving circuit configured to supply a data voltage to the display panel through the data line, and the panel sensing circuit including an analog-to-digital converter (ADC) and the panel sensing circuit configured to sense the display panel through the reference line, the method comprising:

turning on the display panel and displaying an image while the display panel is on;

turning off the display panel;

during a first sensing operation of the ADC while the display panel is off, supplying, by the panel sensing circuit, a first reference voltage to the display panel through the reference line and converting a voltage that is sensed through the reference line in response to the first reference voltage into a digital signal using the analog-to-digital converter without the panel driving circuit supplying the data voltage during the first sensing operation; and during a second sensing operation of an element included in the sub-pixel while the display panel is off, supplying, by the panel sensing circuit, a second reference voltage to the display panel through the reference line and supplying, by the panel driving circuit, the data voltage to the display panel through the data line.

9. The method according to claim 8, wherein the first reference voltage is supplied to the reference line for offset correction of the ADC.

10. The method according to claim 8, wherein supplying the data voltage through the data line during the second sensing operation comprises supplying is a sensing data voltage for deterioration compensation of an element included in the sub-pixel, the sensing data voltage including an overdriving voltage having at least two high voltage levels that are greater than a low voltage level.

11. The method according to claim 10, wherein supplying the sensing data voltage comprises supplying a first overdriving voltage having a first high voltage level and supplying a second overdriving voltage after the first overdriving voltage, the second overdriving voltage having a second high voltage level that is greater than the first high voltage level of the first overdriving voltage.

12. The method according to claim 11, wherein supplying the sensing data voltage comprises supplying the first overdriving voltage for a duration of time that is equal to or longer than a duration of time during which the second overdriving voltage is supplied.

13. The method according to claim 8, further comprising:

performing the sensing operation of the ADC a plurality of times prior to the second sensing operation.

14. The method according to claim 8, wherein the first sensing operation is included in at least one of a period of sensing a red sub-pixel of the display panel, a period of sensing a white sub-pixel of the display panel, a period of sensing a green sub-pixel of the display panel, or a period of sensing a blue sub-pixel of the display panel.

15. A display device comprising:

a display panel including a sub-pixel;

a data line connected to the sub-pixel;

a reference line connected to the sub-pixel;

a panel driving circuit connected to the sub-pixel through the data line, the panel driving circuit configured to supply a data voltage to the display panel through the data line; and a panel sensing circuit connected to the sub-pixel through the reference line, the panel sensing circuit including an analog-to-digital converter (ADC), a first switch connected to a first reference voltage, a second switch connected to a second reference voltage, and a third switch configured to connect the ADC to the reference line, wherein during a first sensing operation of the ADC, the first switch is configured to turn on to supply the first reference voltage to the sub-pixel through the reference line while the second switch is off, and the ADC is configured to convert a voltage that is sensed through the reference line in response to the first reference voltage into a digital signal while the third switch is turned on without the panel driving circuit supplying the data voltage during the first sensing operation, and wherein during a second sensing operation of an element included in the sub-pixel, the second switch is turned on to supply a second reference voltage to the sub-pixel through the reference line while the first switch is off and the panel driving circuit supplies the data voltage to the display panel through the data line after the second reference voltage is supplied to the sub-pixel.

16. The display device according to claim 15, wherein the panel sensing circuit supplies the first reference voltage to the reference line during the first sensing operation for offset correction of the ADC.

17. The display device according to claim 15, wherein during the first sensing operation, the second switch is configured to be turned on prior to the first switch turning on to supply the second reference voltage to the sub-pixel.

18. The display device of claim 15, wherein the data voltage supplied by the panel driving circuit during the second sensing operation is a sensing data voltage for deterioration compensation of the element included in the sub-pixel, and the sensing data voltage includes an overdriving voltage comprising at least two high voltage levels that are greater than a low voltage level.

19. The display device of claim 18, wherein the at least two high voltage levels of the overdriving voltage includes:

a first overdriving voltage having a first high voltage level; and a second overdriving voltage having a second high voltage level that is greater than the first high voltage level of the first overdriving voltage.

20. The display device according to claim 19, wherein a duration of time during which the first overdriving voltage is applied is equal to or longer than a duration of time during which the second overdriving voltage is applied.

* * * * *